US007243076B1

(12) United States Patent
Cardenas

(10) Patent No.: US 7,243,076 B1
(45) Date of Patent: Jul. 10, 2007

(54) COMPUTER NETWORK SYSTEM FOR SHOPPING AND METHOD THEREFOR

(76) Inventor: Frank A. Cardenas, 4864 Zanzibar La., Las Vegas, NV (US) 89147

( * ) Notice: Subject to any disclaimer, the term of this patent is extended or adjusted under 35 U.S.C. 154(b) by 476 days.

(21) Appl. No.: 09/718,283

(22) Filed: Nov. 24, 2000

(51) Int. Cl.
*G06Q 30/00* (2006.01)
(52) U.S. Cl. .......................... 705/26; 705/27; 705/41; 705/74; 709/203; 713/182; 463/25; 235/375; 235/381; 235/383
(58) Field of Classification Search .................. 705/26, 705/27, 74, 22, 41; 709/203; 713/182; 235/375, 235/381, 383; 463/25
See application file for complete search history.

(56) References Cited

U.S. PATENT DOCUMENTS

| 5,434,394 | A | * | 7/1995 | Roach et al. ................ 235/375 |
| 5,822,737 | A | * | 10/1998 | Ogram ......................... 705/26 |
| 5,913,454 | A | * | 6/1999 | McHale ........................ 222/2 |
| 5,950,173 | A | * | 9/1999 | Perkowski .................... 705/26 |
| 6,125,353 | A | * | 9/2000 | Yagasaki ...................... 705/27 |
| 6,142,368 | A | * | 11/2000 | Mullins et al. ............. 235/375 |
| 6,336,100 | B1 | * | 1/2002 | Yamada ........................ 705/26 |
| 6,499,052 | B1 | * | 12/2002 | Hoang et al. ................ 709/203 |
| 6,505,171 | B1 | * | 1/2003 | Cohen et al. ................. 705/26 |
| 6,511,377 | B1 | * | 1/2003 | Weiss ........................... 463/25 |
| 6,601,040 | B1 | * | 7/2003 | Kolls ........................... 705/14 |
| 6,793,135 | B1 | * | 9/2004 | Ryoo ........................... 235/383 |
| 2001/0034663 | A1 | * | 10/2001 | Teveler et al. ................ 705/26 |
| 2001/0047303 | A1 | * | 11/2001 | Greenstone .................. 705/22 |
| 2002/0019781 | A1 | * | 2/2002 | Shooks et al. ................ 705/26 |
| 2002/0026380 | A1 | * | 2/2002 | Su .............................. 705/26 |
| 2002/0029496 | A1 | * | 3/2002 | Morle ........................... 36/99 |
| 2002/0046341 | A1 | * | 4/2002 | Kazaks et al. .............. 713/182 |
| 2004/0159701 | A1 | * | 8/2004 | Abe et al. .................... 235/381 |

FOREIGN PATENT DOCUMENTS

WO     WO 99/63744     * 12/1999

OTHER PUBLICATIONS

Webpage: http://web.archive.org/web/20001018063328/ www.cashx.com/ cashx_splash.shtml extracted from Internet on Dec. 23, 2003.*

* cited by examiner

*Primary Examiner*—Yogesh C. Garg
(74) *Attorney, Agent, or Firm*—Jeffrey D. Moy; Harry M. Weiss; Weiss & Moy, P.C.

(57) ABSTRACT

A system and method for secure and private on-line shopping has an on-line shopping store having a plurality of computers for accessing on-line retailers. An on-line shopping store server is provided and is coupled to the plurality of computers. The on-line shopping store server is used for hosting an on-line shopping store web site. An on-line store shopping card is further provided and is used for purchasing items from the on-line retailers. The on-line store shopping card is a pre-paid card having an assigned monetary value and identification number. A shopping card server is coupled to the on-line shopping store server. The shopping card server is used for verifying authenticity and monetary value of the on-line store shopping card, for crediting and debiting the monetary value of the on-line store shopping card, and for transferring payments to and from a user of the on-line store shopping card and the on-line retailers.

12 Claims, 2 Drawing Sheets

COMPUTER NETWORK SYSTEM FOR SHOPPING AND METHOD THEREFOR

BACKGROUND OF THE INVENTION

1. Field of the Invention

This invention relates to on-line computer shopping and, more specifically, to a system and method that allows all consumers the ability to access a computer to shop on-line in a convenient manner with minimal security risk and maximum privacy.

2. Description of the Prior Art

The Internet and the World Wide Web (WWW) are fast growing systems that are increasing in size year after year. More and more companies are providing, and more and more consumers are purchasing, information, goods, and services via the WWW, electronic mail (email) and other electronic commerce means. Unfortunately, electronic commerce has several problems that are hindering its growth. A main problem facing electronic commerce is how payments for information, goods, and services may be accomplished in an efficient, reliable, and secure manner. A number of organizations have addressed this issue by establishing different types of payment systems which vary widely in design, performance, and security features. However, all systems currently in place still require the consumer to input their credit card or bank account number. No matter how secure a payment system may be, most consumers are reluctant to provide such information due to privacy, security and integrity issues.

Another problem facing electronic commerce has to do with the delivery and receiving of goods that have been purchased. Most consumers who purchase goods via the internet have the goods sent to their home. However, the linguistics of receiving a package for a working consumer becomes very cumbersome and inconvenient. Internet merchandisers have already experienced a certain "backlash" to find ways to overcome problematic deliveries.

Yet another problem hindering the growth of electronic commerce deals with internet advertising. Billions of dollars are spent each year on internet advertising. Analysts report that internet advertising will reach $16.5 billion by the year 2005. Marketers are concerned because internet sites are projected to top 700 million by the same year. The challenge will be for advertisers to find the most cost efficient way of reaching individual consumers. One of the problems with advertising over the internet is that it is generally difficult to target particular types of advertising and other web page content to particular clients, based on the particular needs and interest of the client and their operators.

Therefore, a need existed to provide an improved system and method that allows all consumers the ability to access a computer to shop on-line. The improved system and method will allow consumers to shop in a convenient manner with minimal security risk and maximum privacy. The improved system and method will provide a convenient way for the delivery and receiving of goods that have been purchased by the consumer. The improved system and method will further provide a way to solve internet advertising problems by providing advertisers with a central location to offer consumers access, visibility, and special offers to the consumer.

SUMMARY OF THE INVENTION

In accordance with one embodiment of the present invention, it is an object of the present invention to provide an improved system and method that allows all consumers the ability to access a computer to shop on-line.

It is another object of the present invention to provide an improved system and method that will allow consumers to shop in a convenient manner with minimal privacy and security risk.

It is still another object of the present invention to provide an improved system and method that will provide a convenient way for the delivery and receiving of goods that have been purchased on-line by the consumer.

It is yet another object of the present invention to provide a way to solve internet advertising problems by providing advertisers with a central location to offer consumers access, visibility, and special offers to the consumer.

BRIEF DESCRIPTION OF THE EMBODIMENTS

In accordance with one embodiment of the present invention a system for secure and private on-line shopping is disclosed. The system has an on-line shopping store having a plurality of computers for accessing on-line retailers. An on-line shopping store server is coupled to the plurality of computers. The on-line shopping store server is used for hosting an on-line shopping store web site. An on-line store shopping card is provided and is used for purchasing items from the on-line retailers. The on-line store shopping card is a pre-paid card having an assigned monetary value. A shopping card server is coupled to the on-line shopping store server. The shopping card server is used for verifying authenticity and monetary value of the on-line store shopping card, for crediting and debiting the monetary value of the on-line store shopping card, and for transferring payments to and from a user of the on-line store shopping card and the on-line retailers.

In accordance with another embodiment of the present invention a method for making secure and private on-line purchases is disclosed. The method comprises the steps of: providing an on-line shopping store having a plurality of computers for accessing on-line retailers; providing an on-line shopping store server coupled to the plurality of computers of the on-line shopping store for hosting an on-line shopping store web site; providing an on-line store shopping card for purchasing items from the on-line retailers wherein the on-line shopping card is a pre-paid card having an assigned monetary value; and providing a shopping card server coupled to the on-line shopping store server for verifying authenticity and monetary value of the on-line store shopping card, for crediting and debiting the monetary value of the on-line store shopping card, and for transferring payments to and from a user of the on-line store shopping card and the on-line retailers.

In accordance with another embodiment of the present invention, a method for making secure and private on-line purchases is disclosed. The method comprises the steps of: providing an on-line shopping store having a plurality of computers for accessing on-line retailers; providing an on-line shopping store server coupled to the plurality of computers of the on-line shopping store for hosting an on-line shopping store web site; purchasing an on-line store shopping card for purchasing items from the on-line retailers wherein the on-line shopping card is a pre-paid card having an assigned monetary value and identification number; selecting goods and items to purchase; entering the identification number of the on-line store shopping card; verification of the identification number and funds remaining on the on-line store shopping card; and entering a delivery location of the goods and items purchased when the identification number and funds are verified.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

Figure 1:
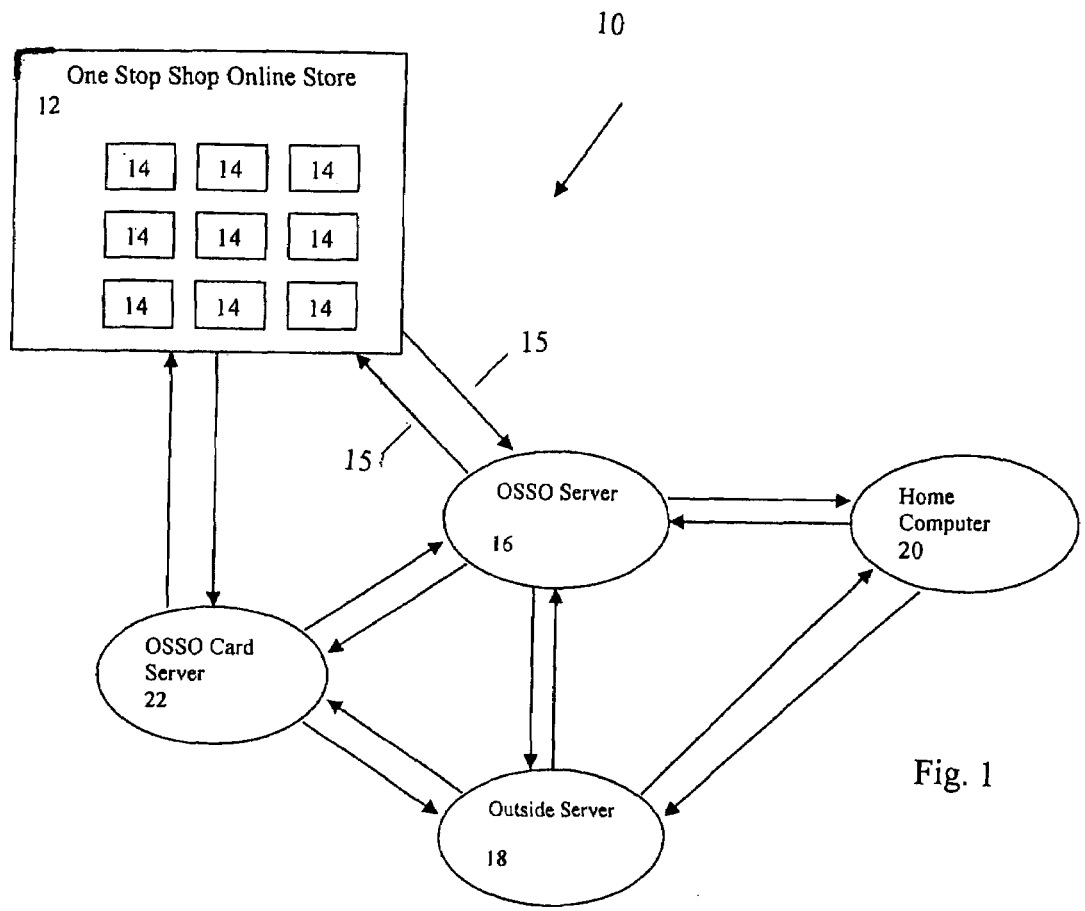
FIG. 1 is a simplified functional block diagram of a computer network system for shopping online representing the present invention.
Figure 2:
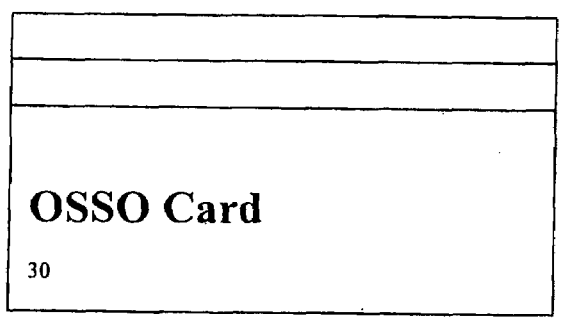
FIG. 2 is a front view of the on-line shopping card used in the present invention.
Figure 3:
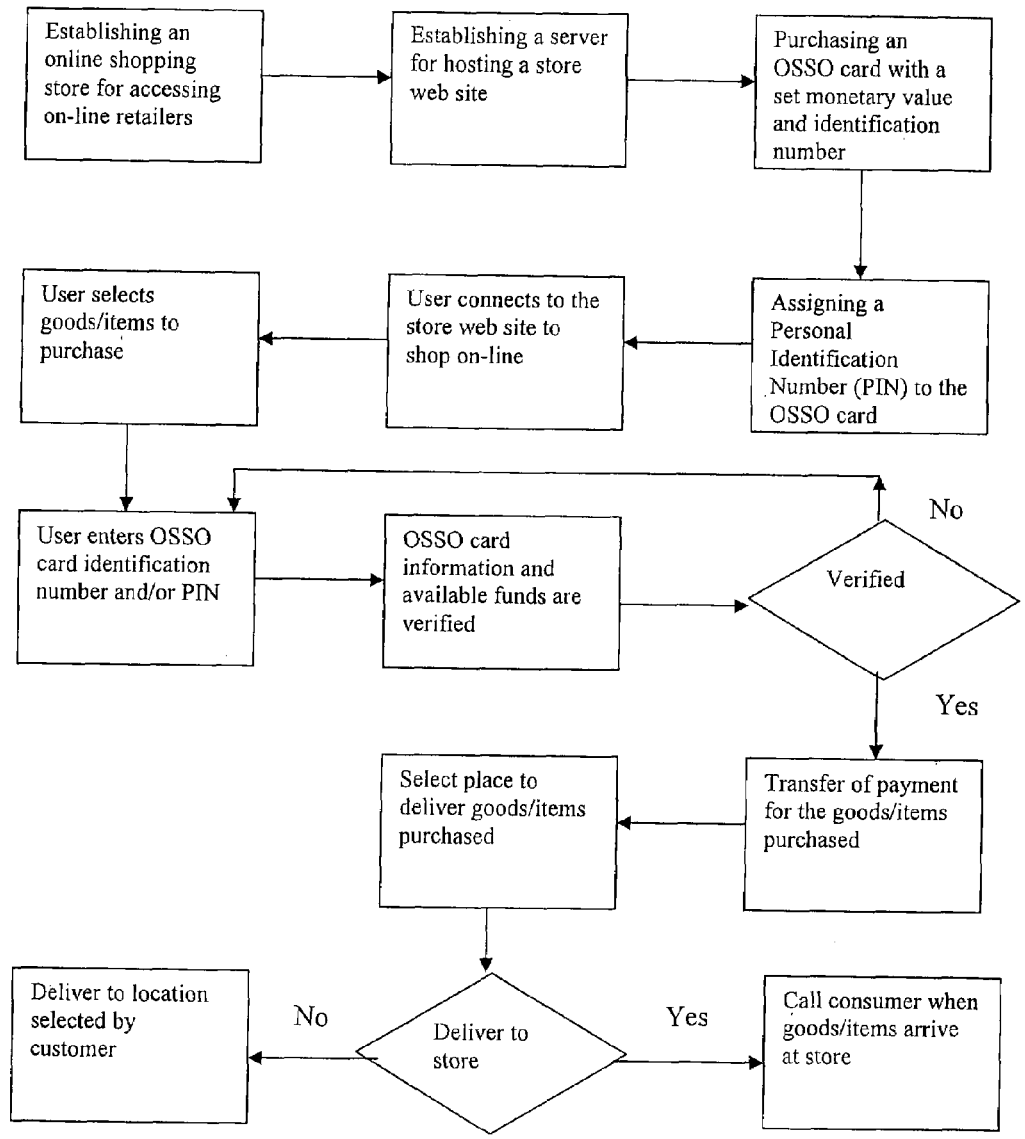
FIG. 3 is a flowchart showing a method for performing on-line purchases.

Referring to FIG. 1, a computer network system for shopping online 10 (hereinafter system 10) is shown. The system 10 will have a One Stop Shopping Online Store 12 (hereinafter OSSO Store 12). The OSSO store 12 will be an establishment which will have a plurality of computers 14. Each of the computers 14 will allow access to on-line web-sites via communication lines 15. The communication lines 15 may be telephone lines or high speed ISDN, DSL, cable lines or the like. The OSSO store 12 will allow consumers the ability to shop on-line in a convenient manner by establishing a central location where individuals may order and pick-up goods purchased on-line. The OSSO store 12 is especially helpful to those individuals who do not have computers but would like the convenience of purchasing goods on-line. The OSSO store 12 will also allow any goods that are purchased by the consumer to be sent directly to the OSSO store 12. The OSSO store 12 will then hold the packages till the consumer picks the package up at the OSSO store 12. Thus, the OSSO store 12 will eliminate many of the problems electronic commerce has with the delivery and receiving of goods that have been purchased by consumers. The OSSO store 12 will further provide a place where once the consumer picks-up the goods, he/she may try on/out the goods purchased. If the consumer is not satisfied with the goods purchased, the OSSO store 12 will return the goods to the retailer and reimburse or credit the consumer back for the purchase.

The OSSO store 12 will allow access to on-line retailers. The on-line retailers may be arranged in several different manners. In accordance with one embodiment of the present invention, a plurality of on-line retailers may be formed into a single network of sites. For example, the OSSO store 12 may have a designated OSSO server 16. The OSSO server 16 would allow access to an OSSO web page which may have several different formats. For example, the home web page may have a listing and links to each of the on-line retailers who are members of the OSSO network. By clicking on the proper link, the consumer will be sent to the specific retailer. The home web page may further include retailer advertising, special retailer sales or promotions, etc. The home web page may further include a listing of other retailers not members of the OSSO network and other popular web sites. The above format helps in eliminating one of the problems associated with electronic commerce since the home web page would allow companies to target particular types of advertising and other web page content to particular clients, based on the particular needs and interest of the client and their operators. Further, the web page would allow a place to show special retailer sales and/or promotions.

The OSSO server 16 would also allow access to outside servers 18. The computers 14 of the OSSO store 12 can access the outside servers 18 either directly via communication lines or via the OSSO server 16. By allowing access to the outside servers 18, consumers at the OSSO store 12 may shop at other web sites that are not members/participants of the plurality of the on-line retailers that form the OSSO network.

Both the OSSO server 16 and the outside server 18 may be accessed by individuals on home computers 20. As may be seen in FIG. 1, the home computer 20 may directly access the OSSO server 16 or can access the OSSO server 16 via the outside server 18. The system 10 may be set up so that the home computer 20 can only access the OSSO server 16 by subscription to the OSSO server 16. This would generally require that the consumer register at an OSSO store 12 and obtain a valid user ID and user password. This information would then be entered by the user of the home computer when he/she tries to access the home web page of the OSSO server 16.

Purchases on the system 10 is accomplished by using an OSSO card 30. The OSSO card 30 is a card with an assigned cash value (i.e., ten dollars, twenty dollars, hundred dollars, etc.). The OSSO card 30 may be a prepaid card which could be purchased at the OSSO store 12, other retail stores, through the mail, with a magazine, or in any desired fashion. The OSSO cards 30 may also be a programmable card. The programmable OSSO card 30 would allow any dollar amount to be programmed onto the card. The programmable OSSO card 30 allows for the flexibility of debiting or crediting the card 30 for purchases and refunds.

Each OSSO card 30 is assigned a unique card number similar to the unique number found on a credit card. The card number may be printed on the OSSO card 30. For security reasons, the card number is generally covered by an opaque adhesive tape or similar material so that the number cannot be read until the tape is removed by the owner of the OSSO card 30. Alternatively, the card number may be printed on a piece of paper which is placed in a security envelope and placed with the OSSO card 30. For additional security, when each individual purchases an OSSO card 30, the individual may assign a personal identification number (PIN) to the OSSO card 30.

After a person purchases an OSSO card 30, he/she can open the envelope or remove the adhesive tape to see the card number. The OSSO card may now be used for purchases. Purchases are made in the following manner. Individuals may shop either at their home computer 20 or at a computer 14 at the OSSO store 12. The individual will access on-line retailers. As stated above, the on-line retailers may be arranged to form a single network of sites or the individual may access other web sites that are outside of the single network of sites. If an individual wishes to purchase goods, information, etc from one of the web sites, the individual will be prompted to input the number of the OSSO card 30. For additional security, the web site may require that the PIN assigned to the OSSO card 30 also to be entered.

Once this information is entered and submitted, the OSSO card 30 and the funds available on the OSSO card 30 are verified. Verification may be accomplished in numerous ways. In accordance with one embodiment of the present invention, all OSSO card information is stored on a card server 22. The card server 22 is coupled to the OSSO server 16 and outside server 18. When a purchase is made, the OSSO server 16 or the outside server 18 will access the card server 22. The validity of the OSSO card 30 and the amount of money left on the OSSO card 30 is verified. If the number of the OSSO card 30 (and for additional security the PIN) is valid, and the OSSO card still has a sufficient amount of money left to make the purchase, the card server 22 will authorize the purchase. If the OSSO card number or the PIN is invalid, or if there is not a sufficient amount of money left on the OSSO card 30, the card server 22 will not authorize the purchase. The individual must then input the information once again to be verified by the card server 22. Once again, if the OSSO card number or the PIN is invalid, or if there is not a sufficient amount of money left on the OSSO card 30, the card server 22 will not authorize the purchase. After a few times of incorrect information being inputted, the home computer 20 or the computer 14 at the OSSO store 12 will be locked out of the web site.

If the information that was inputted is correct and the OSSO card has a sufficient amount of funds, the card server 22 will authorize the transaction. The card server 22 will then adjust the amount of money left on the OSSO card 30. The adjustment may be done in several manners. In accordance with one embodiment of the present invention, the dollar value of each card is stored on the card server 22. Thus any debits or credits to the OSSO card 30 is updated on the card server 22. For programmable OSSO cards 30, they may be updated if the computer 14 or home computer 20 has a card reader built into the machine. Thus, the card server 22 could adjust the balance of the programmable OSSO card 30 directly via the card reader.

Once a purchase is authorized, the purchaser will indicate where the goods that were purchased should be delivered. The system 10 works so that the user of the computer 14 and the user of the home computer 20 can have the goods that were purchased sent to either his/her home or to a designated OSSO store 12. If the good are delivered to the OSSO store 12, the OSSO store 12 will hold the packages till the consumer picks the package up. By having the option of picking up the purchased goods at the OSSO store 12, the system 10 helps to solve one of the problems associated with electronic commerce since the linguistics of receiving a package for a working consumer becomes very cumbersome and inconvenient.

When a person is finished at the computer 14 at the OSSO store 12, he/she may return the OSSO card 30. He/she will then be reimbursed for any amount of money left on the OSSO card 30. Likewise, any person using a home computer may return the OSSO card 30 to the OSSO store 10 for any refund of unused money.

Once the goods arrive at the OSSO store 12, the OSSO store 12 will call the individual who purchased the goods. When the individual picks up the purchased good, he/she may try on/out the goods purchased. If the consumer is not satisfied with the goods purchased, the OSSO store 12 will return the goods to the retailer and reimburse or credit the consumer back for the purchase.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for secure and private on-line shopping comprising, in combination:

a store housing a plurality of computers, the store functioning as an on-line shopping store where individuals order merchandise using the plurality of computers and have the merchandise delivered to the store for pick-up, one enters a delivery location for the merchandise on one of the plurality of computers if delivery is not to the store;

an on-line shopping store server coupled to the plurality of computers of the on-line shopping store for hosting an on-line shopping store web site and for hosting a plurality of on-line retailers formed into a single membership network of sites;

at least one home computer coupled to the on-line shopping store server for accessing on-line retailers from a remote location, a user of the home computer needing a subscription to access the on-line shopping store server;

an on-line store shopping card as the only means for purchasing items from the on-line shopping store and the on-line retailers by individuals using the plurality of computers at the store and remotely at the at least one home computer, wherein the on-line store shopping card is a pre-paid card having an assigned monetary value, individuals using the on-line store shopping card being able to return the on-line store shopping card for cash on unused credit after shopping at the store; and an in-system on-line store shopping card server coupled to the on-line shopping store server for verifying authenticity and monetary value of the on-line store shopping card, for crediting and debiting the monetary value of the on-line store shopping card, and for transferring payments to and from a user of the on-line store shopping card and the on-line retailers.

2. A system for secure and private on-line shopping in accordance with claim 1 further comprising an outside server coupled to the on-line shopping store server and the on-line shopping card server for accessing web sites that are not located on the on-line shopping store server.

3. A system for secure and private on-line shopping in accordance with claim 1 wherein the on-line retailers are formed into a single network of sites and are hosted on the on-line shopping store server.

4. A system for secure and private on-line shopping in accordance with claim 1 wherein the on-line shopping server host a home web page having hyperlinks to the on-line retailers.

5. A system for secure and private on-line shopping in accordance with claim 1 wherein the on-line shopping card has an identification number which is used when purchasing goods from the on-line retailers.

6. A system for secure and private on-line shopping in accordance with claim 5 wherein the identification number is located on the on-line shopping card.

7. A system for secure and private on-line shopping in accordance with claim 6 wherein the identification number located on the on-line shopping card is covered with a removable opaque adhesive tape.

8. A system for secure and private on-line in accordance with claim 5 wherein the identification number is located on a piece of paper attached to the on-line shopping card.

9. A system for secure and private on-line in accordance with claim 1 wherein the on-line shopping a programmable on-line shopping card.

10. A method for making secure and private on-line purchases comprising the steps of:

providing a store housing a plurality of computers, the store functioning as an on-line shopping store where individuals order merchandise using the plurality of computers and have the merchandise delivered to the store for pick-up;

providing at least one home computer for ordering merchandise from a remote location;

providing an on-line shopping store server coupled to the plurality of computers of the on-line shopping store and the at least one home computer for hosting an on-line shopping store web site and for hosting a plurality of on-line retailers formed into a single membership network of sites, a user of the home computer needing a subscription to access the on-line shopping store server;

purchasing an on-line store shopping card, the on-line store shopping card is the only means for purchasing items from the on line shopping store and the on-line retailers wherein the on-line shopping card is a prepaid card having an assigned monetary value and identification number, individuals using the on-line store shopping card being able to return the on-line store shopping card for cash on unused credit after shopping at the store;

selecting goods and items to purchase;

entering the identification number of the on-line store-shopping card;

verification of the identification number and funds remaining on the on-line store shopping card by an in-network server; and entering a delivery location using one of the plurality of computers of the goods and items purchased if delivery is not to the store when the identification number and funds are verified.

11. The method of claim 10 further comprising the step of assigning a Personal Identification Number (PIN) to the on-line store shopping card.

12. The method of claim 10 further comprising the steps of:

selecting the on-line shopping store as the delivery location; and calling a purchaser when the goods and items purchased have arrived at the on-line shopping store.

* * * * *